(12) United States Patent
Hamamoto

(10) Patent No.: US 10,923,305 B2
(45) Date of Patent: Feb. 16, 2021

(54) NO-VOLTAGE OUTPUT AND VOLTAGE OUTPUT SWITCHING CIRCUIT

(71) Applicant: Mitsubishi Electric Corporation, Tokyo (JP)

(72) Inventor: Wataru Hamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 4 days.

(21) Appl. No.: 16/066,844

(22) PCT Filed: Jul. 13, 2016

(86) PCT No.: PCT/JP2016/070740
§ 371 (c)(1),
(2) Date: Jun. 28, 2018

(87) PCT Pub. No.: WO2018/011925
PCT Pub. Date: Jan. 18, 2018

(65) Prior Publication Data
US 2019/0131092 A1    May 2, 2019

(51) Int. Cl.
*H01H 47/00* (2006.01)
*G06F 1/26* (2006.01)
*G05F 1/46* (2006.01)

(52) U.S. Cl.
CPC ............. *H01H 47/001* (2013.01); *G05F 1/46* (2013.01); *G06F 1/26* (2013.01)

(58) Field of Classification Search
CPC .......................... H01H 47/00; H01H 47/001
See application file for complete search history.

(56) References Cited

U.S. PATENT DOCUMENTS

| 4,617,604 A | 10/1986 | Narimatsu et al. |
| 5,418,455 A * | 5/1995 | Takaishi ................. G01B 7/003 174/261 |

(Continued)

FOREIGN PATENT DOCUMENTS

| JP | 08-044966 A | 2/1996 |
| JP | 2001-043462 A | 2/2001 |

(Continued)

OTHER PUBLICATIONS

Office Action dated Apr. 24, 2019 issued in corresponding CA patent application No. 3,018,538.

(Continued)

*Primary Examiner* — Adi Amrany
(74) *Attorney, Agent, or Firm* — Posz Law Group, PLC

(57) ABSTRACT

A no-voltage output and voltage output switching circuit includes an actuator connection terminal block including a plurality of ports each including a first pin, a second pin, and a third pin to which an actuator is connected, a power connection terminal block including a voltage terminal and a common terminal to which a power supply is connected, first relays, and second relays. The common terminal is connected to the second pin of each of the plurality of ports. The first relay enables connection between the first pin of a corresponding port among the plurality of ports and the third pin of the corresponding port. The second relay corresponding to the port corresponding to the first relay enables connection between the first pin of the port and the voltage terminal.

6 Claims, 6 Drawing Sheets

(56) References Cited

U.S. PATENT DOCUMENTS

| | | | | |
|---|---|---|---|---|
| 5,925,999 | A * | 7/1999 | Lakerdas | H02P 7/08 |
| | | | | 318/495 |
| 10,162,399 | B2 * | 12/2018 | Atkinson | G06F 1/26 |
| 2004/0041826 | A1 * | 3/2004 | Nakagawa | G09G 3/3607 |
| | | | | 345/694 |
| 2007/0285072 | A1 * | 12/2007 | Kumagai | H02M 3/1584 |
| | | | | 323/285 |
| 2008/0122291 | A1 * | 5/2008 | Uchimoto | H02M 3/1584 |
| | | | | 307/31 |
| 2012/0042187 | A1 * | 2/2012 | Morimura | G06F 1/3212 |
| | | | | 713/323 |
| 2012/0138442 | A1 * | 6/2012 | Beatty, Jr. | H01H 71/082 |
| | | | | 200/51 R |
| 2016/0336850 | A1 * | 11/2016 | Lesso | H03F 3/187 |

FOREIGN PATENT DOCUMENTS

| | | |
|---|---|---|
| JP | 2001-209865 A | 8/2001 |
| JP | 2005-100094 A | 4/2005 |

OTHER PUBLICATIONS

Office Action dated Mar. 14, 2019 issued in corresponding AU patent application No. 2016414878.
International Search Report of the International Searching Authority dated Sep. 20, 2016 for the corresponding international application No. PCT/JP2016/070740 (and English translation).
Extended EP Search Report dated Jul. 30, 2018 issued in corresponding EP patent application No. 16907681.7.
Office Action dated May 1, 2020 issued in corresponding Canadian patent application No. 3,018,538.

* cited by examiner

| PORT | 21a | 21b | 21c | 21d |
|------|-----|-----|-----|-----|
| ON   | ▨   |     | ▨   |     |
| OFF  |     | ▨   |     | ▨   |

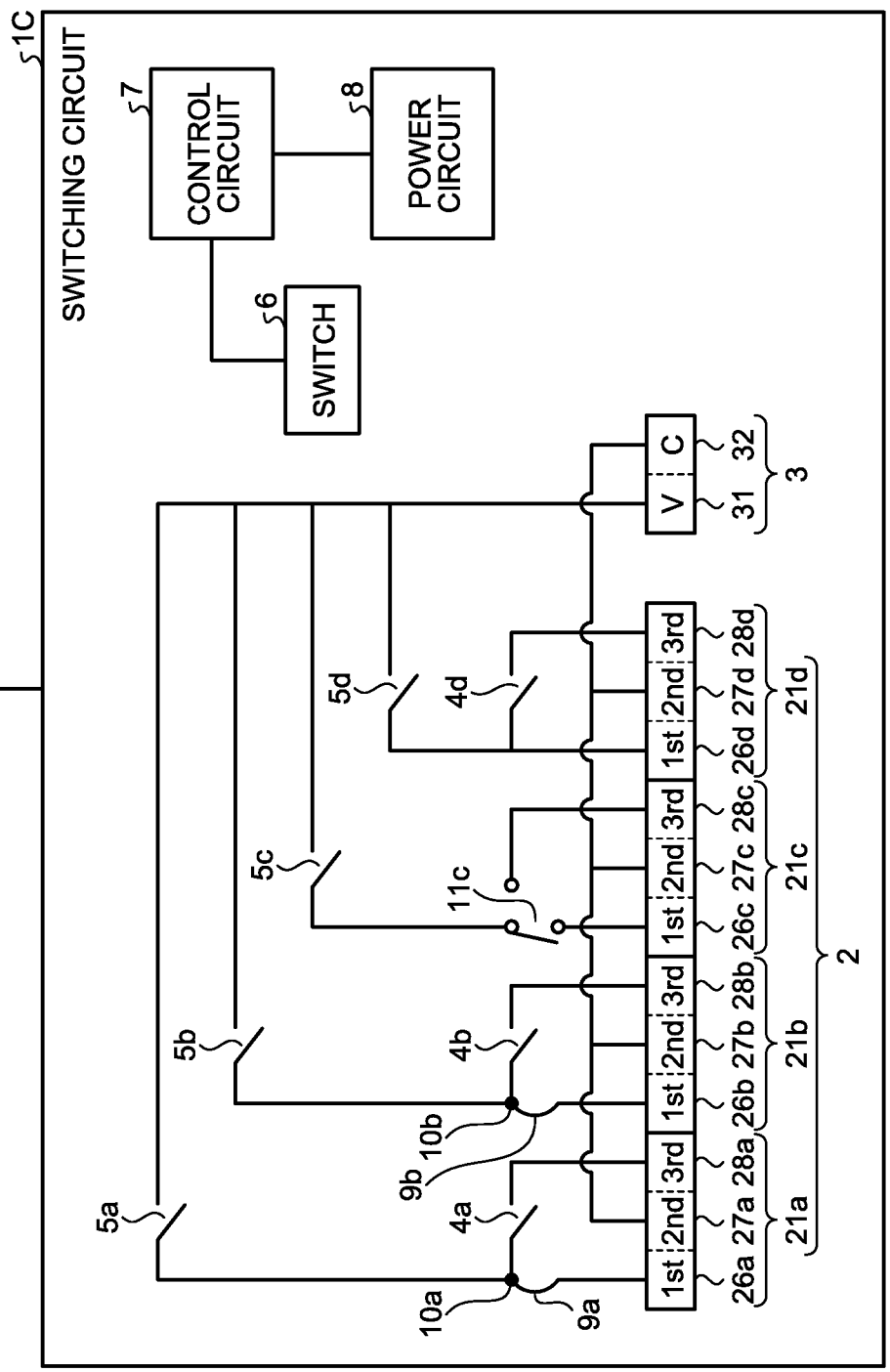

NO-VOLTAGE OUTPUT AND VOLTAGE OUTPUT SWITCHING CIRCUIT

CROSS REFERENCE TO RELATED APPLICATION

This application is a U.S. national stage application of PCT/JP2016/070740 filed on Jul. 13, 2016, the contents of which are incorporated herein by reference.

FIELD

The present invention relates to a no-voltage output and voltage output switching circuit for switching between no-voltage output and voltage output.

BACKGROUND

To support both an actuator controlled by no-voltage output and an actuator controlled by voltage output, a circuit for switching between no-voltage output and voltage-output has been proposed (see Patent Literature 1, for example).

CITATION LIST

Patent Literature

Patent Literature 1: Japanese Patent Application Laid-open No. H8-44966

SUMMARY

Technical Problem

However, the above conventional circuit, which allows switching between no-voltage output and voltage output, can control all actuators connected to a plurality of ports only by either no-voltage output or voltage output. That is, the above conventional circuit cannot select no-voltage output or voltage output on a port-by-port basis.

The present invention has been made in view of the above, and has an object of providing a no-voltage output and voltage output switching circuit that allows independent switching between no-voltage output and voltage output for each of a plurality of ports.

Solution to Problem

To solve the above-described problem and attain the object, a no-voltage output and voltage output switching circuit according to the present invention includes an actuator connection terminal block including a plurality of ports each including a first pin, a second pin, and a third pin to which an actuator is connected, a power connection terminal block, a plurality of first relays, and a plurality of second relays. The power connection terminal block includes a voltage terminal and a common terminal to which a power supply is connected. The voltage terminal is a terminal to which a voltage different from a voltage applied to the common terminal is applied when the power supply is connected to the power connection terminal block. The common terminal is connected to the second pin of each of the plurality of ports. Each of the plurality of first relays corresponds to one of the plurality of ports, and each of the plurality of ports corresponds to one of the plurality of first relays. Each of the plurality of second relays corresponds to one of the plurality of ports, and each of the plurality of ports corresponds to one of the plurality of second relays. One of the plurality of first relays is a first specific relay that enables connection between the first pin of a corresponding port among the plurality of ports and the third pin of the corresponding port. The second relay corresponding to a port among the plurality of ports corresponding to the first specific relay enables connection between the first pin of the port corresponding to the first specific relay and the voltage terminal.

Advantageous Effects of Invention

The no-voltage output and voltage output switching circuit according to the present invention achieves an effect of allowing independent switching between no-voltage output and voltage output for each of the plurality of ports.

BRIEF DESCRIPTION OF DRAWINGS

FIG. 7 is a diagram illustrating the configuration of a no-voltage output and voltage output switching circuit according to a fourth embodiment.

DESCRIPTION OF EMBODIMENTS

Hereinafter, no-voltage output and voltage output switching circuits according to embodiments of the present invention will be described in detail with reference to the drawings. The embodiments are not intended to limit the invention.

First Embodiment

Figure 1:
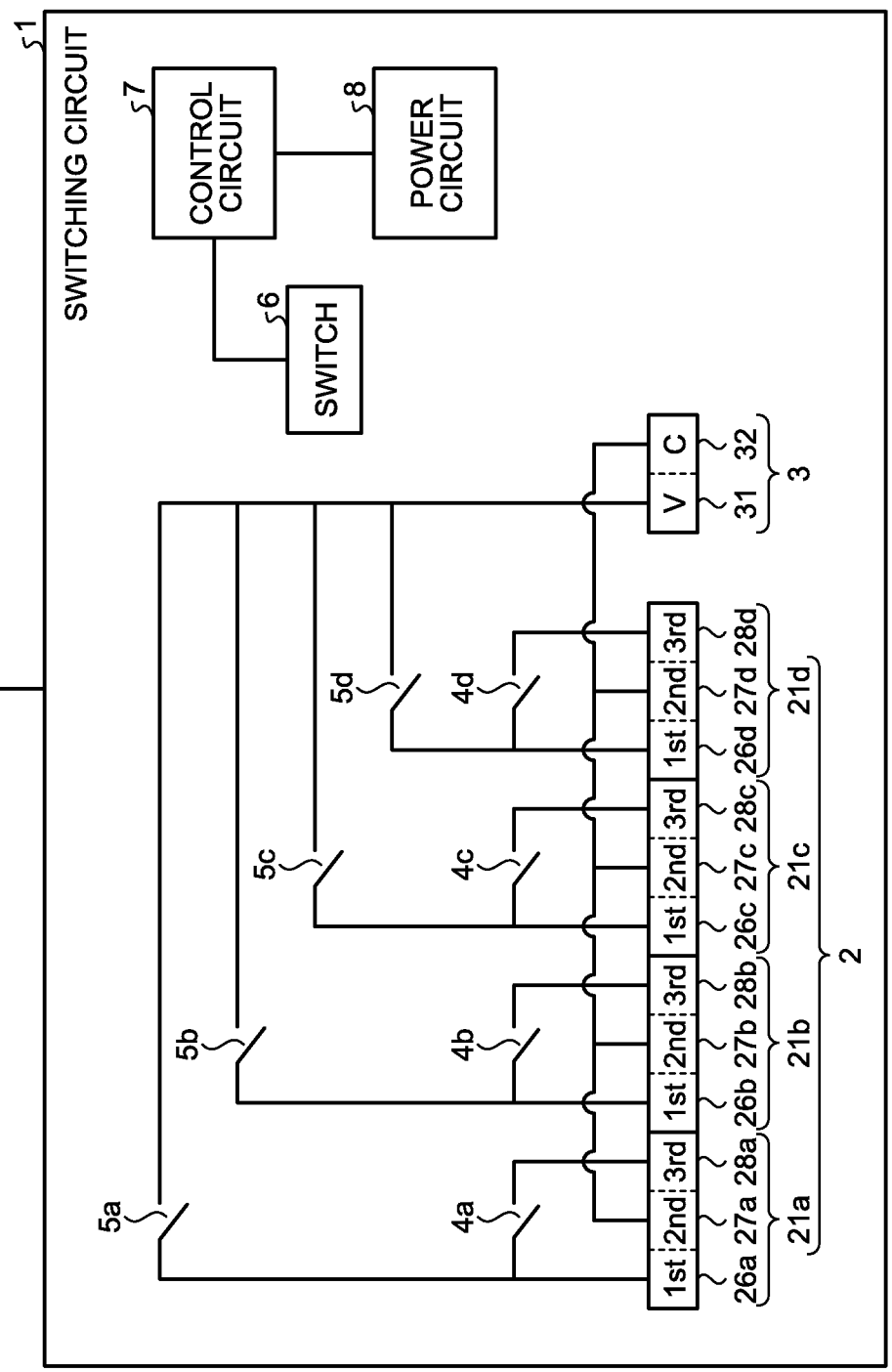
FIG. 1 is a diagram illustrating the configuration of a no-voltage output and voltage output switching circuit according to a first embodiment.

First, the configuration of a no-voltage output and voltage output switching circuit 1 according to a first embodiment will be described. FIG. 1 is a diagram illustrating the configuration of the no-voltage output and voltage output switching circuit 1 according to the first embodiment. In the present application, a "no-voltage output and voltage output switching circuit" is sometimes referred to as a "switching circuit." The switching circuit 1 includes an actuator connection terminal block 2. The actuator connection terminal block 2 includes a port 21a, a port 21b, a port 21c, and a port 21d to which actuators are connected. To describe FIG. 1 simply, the actuators are not illustrated in FIG. 1.

The port 21a, the port 21b, the port 21c, and the port 21d are an example of a plurality of ports. The port 21a, the port 21*b*, the port 21*c*, and the port 21*d* are each independent from the other ports. The port 21*a*, the port 21*b*, the port 21*c*, and the port 21*d* may be formed integrally. The port 21*a*, the port 21*b*, the port 21*c*, and the port 21*d* may each be formed in a separated state from the other ports.

The port 21*a* includes a first pin 26*a*, a second pin 27*a*, and a third pin 28*a*. The port 21*b* includes a first pin 26*b*, a second pin 27*b*, and a third pin 28*b*. The port 21*c* includes a first pin 26*c*, a second pin 27*c*, and a third pin 28*c*. The port 21*d* includes a first pin 26*d*, a second pin 27*d*, and a third pin 28*d*. To each of the pins, an actuator is connected.

The first pin 26*b*, the first pin 26*c*, and the first pin 26*d* each include a function identical to that of the first pin 26*a*. The second pin 27*b*, the second pin 27*c*, and the second pin 27*d* each include a function identical to that of the second pin 27*a*. The third pin 28*b*, the third pin 28*c*, and the third pin 28*d* each include a function identical to that of the third pin 28*a*. That is, the port 21*b*, the port 21*c*, and the port 21*d* each include a function identical to that of the port 21*a*.

The switching circuit 1 further includes a power connection terminal block 3. The power connection terminal block 3 includes a voltage terminal 31 and a common terminal 32 to which a power supply is connected. The voltage terminal 31 is a terminal to which a voltage different from a voltage applied to the common terminal 32 is applied when the power supply is connected to the power connection terminal block 3. The common terminal 32 is connected to the second pin 27*a* of the port 21*a*, the second pin 27*b* of the port 21*b*, the second pin 27*c* of the port 21*c*, and the second pin 27*d* of the port 21*d* individually.

The switching circuit 1 further includes a first relay 4*a*, a first relay 4*b*, a first relay 4*c*, and a first relay 4*d*. The first relay 4*a*, the first relay 4*b*, the first relay 4*c*, and the first relay 4*d* are an example of a plurality of first relays. The first relay 4*a* corresponds to the port 21*a*, the first relay 4*b* corresponds to the port 21*b*, the first relay 4*c* corresponds to the port 21*c*, and the first relay 4*d* corresponds to the port 21*d*.

The first relay 4*b*, the first relay 4*c*, and the first relay 4*d* each include a function identical to that of the first relay 4*a*. The first relay 4*a*, the first relay 4*b*, the first relay 4*c*, and the first relay 4*d* are each a normally open contact relay. The first relay 4*a*, the first relay 4*b*, the first relay 4*c*, and the first relay 4*d* are each a relay for supplying no-voltage output to an actuator connected to a corresponding port.

The first relay 4*a* enables connection between the first pin 26*a* of the corresponding port 21*a* and the third pin 28*a* of the port 21*a*. The first relay 4*b* enables connection between the first pin 26*b* of the corresponding port 21*b* and the third pin 28*b* of the port 21*b*. The first relay 4*c* enables connection between the first pin 26*c* of the corresponding port 21*c* and the third pin 28*c* of the port 21*c*. The first relay 4*d* enables connection between the first pin 26*d* of the corresponding port 21*d* and the third pin 28*d* of the port 21*d*.

The switching circuit 1 further includes a second relay 5*a*, a second relay 5*b*, a second relay 5*c*, and a second relay 5*d*. The second relay 5*a*, the second relay 5*b*, the second relay 5*c*, and the second relay 5*d* are an example of a plurality of second relays. The second relay 5*a* corresponds to the port 21*a*, the second relay 5*b* corresponds to the port 21*b*, the second relay 5*c* corresponds to the port 21*c*, and the second relay 5*d* corresponds to the port 21*d*.

That is, the second relay 5*a* corresponds to the first relay 4*a*, the second relay 5*b* corresponds to the first relay 4*b*, the second relay 5*c* corresponds to the first relay 4*c*, and the second relay 5*d* corresponds to the first relay 4*d*. The second relay 5*b*, the second relay 5*c*, and the second relay 5*d* each include a function identical to that of the second relay 5*a*. The second relay 5*a*, the second relay 5*b*, the second relay 5*c*, and the second relay 5*d* are each a normally open contact relay. The second relay 5*a*, the second relay 5*b*, the second relay 5*c*, and the second relay 5*d* are each a relay for supplying voltage output to an actuator connected to the corresponding port.

The second relay 5*a* enables connection between the first pin 26*a* of the corresponding port 21*a* and the voltage terminal 31. The second relay 5*b* enables connection between the first pin 26*b* of the corresponding port 21*b* and the voltage terminal 31. The second relay 5*c* enables connection between the first pin 26*c* of the corresponding port 21*c* and the voltage terminal 31. The second relay 5*d* enables connection between the first pin 26*d* of the corresponding port 21*d* and the voltage terminal 31.

Figures 2, 3:
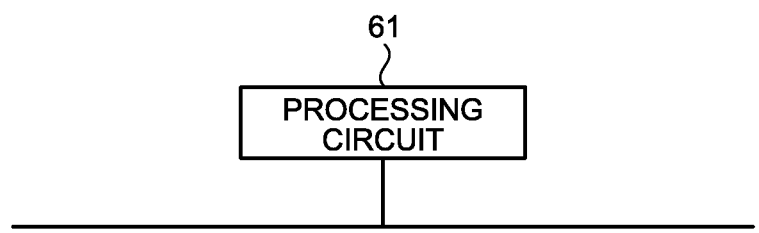
FIG. 2 is a diagram illustrating the configuration of a switch of the no-voltage output and voltage output switching circuit according to the first embodiment.
FIG. 3 is a diagram illustrating a processing circuit when at least a component of a control circuit of the no-voltage output and voltage output switching circuit according to the first embodiment constitutes the processing circuit.

The switching circuit 1 further includes a switch 6 that allows a user to select either no-voltage output or voltage output for the port 21*a*, the port 21*b*, the port 21*c*, and the port 21*d* individually. FIG. 2 is a diagram illustrating the configuration of the switch 6 of the no-voltage output and voltage output switching circuit 1 according to the first embodiment. The switch 6 is a Dual In-line Package (DIP) switch, for example. When the user selects voltage output for the port 21*a*, the port 21*b*, the port 21*c*, and the port 21*d* individually, "ON" on the switch 6 is selected by the user. When the user selects no-voltage output, "OFF" on the switch 6 is selected by the user. Shaded portions in FIG. 2 indicate that the shaded portions are selected.

FIG. 2 illustrates a situation where on the switch 6, "ON" corresponding to voltage output is selected for the port 21*a* and the port 21*c* individually, and "OFF" corresponding to no-voltage output is selected for the port 21*b* and the port 21*d* individually.

The switching circuit 1 further includes a control circuit 7 that controls the first relay 4*a*, the first relay 4*b*, the first relay 4*c*, the first relay 4*d*, the second relay 5*a*, the second relay 5*b*, the second relay 5*c*, and the second relay 5*d* individually. The control circuit 7 controls each of the plurality of first relays and the plurality of second relays, according to a selection made by the user using the switch 6. The control circuit 7 includes an integrated circuit for performing the control. An example of the integrated circuit is a microcomputer.

Part or all of the functions of the control circuit 7 may be implemented by a processing circuit 61. FIG. 3 is a diagram illustrating the processing circuit 61 when at least a component of the control circuit 7 of the no-voltage output and voltage output switching circuit 1 according to the first embodiment constitutes the processing circuit 61. The processing circuit 61 is dedicated hardware. Specifically, the processing circuit 61 is, for example, a single circuit, a combined circuit, a programmed processor, a parallel-programmed processor, an application-specific integrated circuit (ASIC), a field-programmable gate array (FPGA), or a combination of them. Part of the control circuit 7 may be dedicated hardware separate from the remainder.

Figure 4:
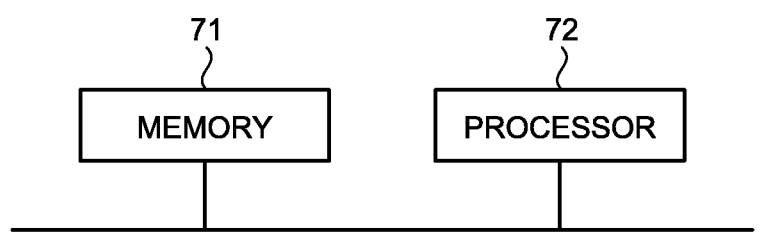
FIG. 4 is a diagram illustrating a processor when at least a component of the control circuit of the no-voltage output and voltage output switching circuit according to the first embodiment constitutes the processor.

Part or all of the functions of the control circuit 7 may be implemented by a processor 72 that executes a program stored in a memory 71. FIG. 4 is a diagram illustrating the processor 72 when at least a component of the control circuit 7 of the no-voltage output and voltage output switching circuit 1 according to the first embodiment constitutes the processor 72. FIG. 4 also illustrates the memory 71. The processor 72 is a central processing unit (CPU), a processing unit, an arithmetic unit, a microprocessor, a microcomputer, or a digital signal processor (DSP).

When at least a component of the control circuit 7 constitutes the processor 72, the functions of the component of the control circuit 7 are implemented by a combination of the processor 72 and software, firmware, or software and firmware. Software or firmware is described as a program and stored in the memory 71. The processor 72 reads out and executes the program stored in the memory 71, thereby implementing the functions of the component of the control circuit 7.

That is, when at least a component of the control circuit 7 constitutes the processor 72, the control circuit 7 includes the memory 71 for storing a program that results in execution of steps executed by the component constituting the control circuit 7. It can be said that the program stored in the memory 71 causes a computer to execute a process or method executed by the component of the control circuit 7.

The memory 71 is, for example, nonvolatile or volatile semiconductor memory such as random-access memory (RAM), read-only memory (ROM), flash memory, an erasable programmable read-only memory (EPROM), or an electrically erasable programmable read-only memory (EEPROM), or a magnetic disk, a flexible disk, an optical disk, a compact disk, a mini disk, a digital versatile disk (DVD), or the like.

Part of the functions of the control circuit 7 may be implemented by dedicated hardware, and the remainder may be implemented by software or firmware. Thus, the functions of the control circuit 7 can be implemented by hardware, software, firmware, or a combination of them.

The switching circuit 1 further includes a power circuit 8 that supplies power to the control circuit 7. An external control apparatus 50 that controls the switching circuit 1 and actuators connected to the switching circuit 1 is connected to the switching circuit 1. The external control apparatus 50 may control the switching circuit 1 and the actuators by radio, or may control the switching circuit 1 and the actuators by wire. The external control apparatus 50 may be included in the switching circuit 1.

Next, a method of using the switching circuit 1 will be described. A user connects each of four actuators to the port 21a, the port 21b, the port 21c, or the port 21d. The user is, for example, an operator who mounts actuators to the switching circuit 1. To supply no-voltage output to an actuator, the user connects the actuator to a first pin and a third pin of a port. For example, to supply no-voltage output to an actuator to be mounted to the port 21a, the user connects the actuator to the first pin 26a of the port 21a and the third pin 28a of the port 21a.

To supply voltage output to an actuator, the user connects the actuator to a first pin and a second pin of a port. For example, to supply voltage output to an actuator to be mounted to the port 21a, the user connects the actuator to the first pin 26a of the port 21a and the second pin 27a of the port 21a.

Next, the user selects either no-voltage output or voltage output for the port 21a, the port 21b, the port 21c, and the port 21d individually, using the switch 6. For example, to supply voltage output to an actuator mounted to the port 21a, the user selects "ON" on a portion of the switch 6 corresponding to the port 21a as illustrated in FIG. 2. For example, to supply no-voltage output to an actuator mounted to the port 21b, the user selects "OFF" on a portion of the switch 6 corresponding to the port 21b as illustrated in FIG. 2.

The control circuit 7 controls on and off of each of the plurality of first relays and the plurality of second relays, according to a selection made by the user using the switch 6. For example, when the user selects "ON" for the port 21a, using the switch 6, the control circuit 7 turns the first relay 4a off and turns the second relay 5a on. For example, when the user selects "OFF" for the port 21b, using the switch 6, the control circuit 7 turns the first relay 4b on and turns the second relay 5b off.

As described above, the switching circuit 1 in the first embodiment includes the port 21a, the port 21b, the port 21c, and the port 21d each including the first pin, the second pin, and the third pin. In addition, the switching circuit 1 includes the first relay 4a, the first relay 4b, the first relay 4c, and the first relay 4d. The first relay 4a, the first relay 4b, the first relay 4c, and the first relay 4d each enable connection between the first pin of the corresponding port and the third pin of the corresponding port. In other words, the first relay 4a, the first relay 4b, the first relay 4c, and the first relay 4d each select no-voltage output when an actuator is connected to the first pin and the third pin at the corresponding port. That is, the first relay 4a, the first relay 4b, the first relay 4c, and the first relay 4d each allow supply of no-voltage output to an actuator when the actuator is connected to the first pin and the third pin at the corresponding port.

The switching circuit 1 further includes the second relay 5a, the second relay 5b, the second relay 5c, and the second relay 5d. The second relay 5a, the second relay 5b, the second relay 5c, and the second relay 5d each enable connection between the first pin of the corresponding port and the voltage terminal 31 of the power connection terminal block 3. The common terminal 32 of the power connection terminal block 3 is connected to the second pin of each port.

Thus, the second relay 5a, the second relay 5b, the second relay 5c, and the second relay 5d each select voltage output when an actuator is connected to the first pin and the second pin at the corresponding port. That is, the second relay 5a, the second relay 5b, the second relay 5c, and the second relay 5d each allow supply of voltage output to an actuator when the actuator is connected to the first pin and the second pin at the corresponding port.

As described above, the switching circuit 1 in the first embodiment can supply no-voltage output to an actuator when the actuator is connected to the first pin and the third pin at each port, and can supply voltage output to an actuator when the actuator is connected to the first pin and the second pin. As described above, the port 21a, the port 21b, the port 21c, and the port 21d are each independent from the other ports.

Thus, the switching circuit 1 allows independent switching between no-voltage output and voltage output for the port 21a, the port 21b, the port 21c, and the port 21d individually. That is, the user can select no-voltage output or voltage output for each port of the switching circuit 1. As a result, the user can simultaneously control a plurality of actuators corresponding to no-voltage output or voltage output by using the switching circuit 1.

As described with reference to FIG. 2, in the above-described first embodiment, when the user selects voltage output for the port 21a, the port 21b, the port 21c, and the port 21d individually, "ON" on the switch 6 is selected by the user, and when the user selects no-voltage output, "OFF" on the switch 6 is selected by the user. However, "ON" and "OFF" on the switch 6 may be set in an opposite way to the above-described case. Specifically, when the user selects voltage output for the port 21a, the port 21b, the port 21c, and the port 21d individually, "OFF" on the switch 6 may be selected by the user, and when the user selects no-voltage output, "ON" on the switch 6 may be selected by the user.

On the switch 6 in FIG. 2, the position where "ON" or "OFF" of the port 21a is selected is leftmost, and the position where "ON" or "OFF" of the port 21d is selected is rightmost. However, the positions where "ON" or "OFF" of the port 21a, the port 21b, the port 21c, and the port 21d is selected individually are not limited to the positions illustrated in FIG. 2. For example, the position where "ON" or "OFF" of the port 21a is selected may be rightmost, and the position where "ON" or "OFF" of the port 21d is selected may be leftmost.

When the user selects no-voltage output or voltage output for the port 21a, the port 21b, the port 21c, and the port 21d individually, the switch 6 is used in the above-described first embodiment. A means for selecting no-voltage output or voltage output may be a means substituting for the switch 6. An example of the means substituting for the switch 6 is a hardware switch.

Another example of the means substituting for the switch 6 is jumpers provided to the port 21a, the port 21b, the port 21c, and the port 21d individually. For example, the user disconnects a jumper when selecting no-voltage output, and keeps a connecting state of the jumper when selecting voltage output. Alternatively, for example, the user keeps a connecting state of a jumper when selecting no-voltage output, and disconnects the jumper when selecting voltage output.

Still another example of the means substituting for the switch 6 is the external control apparatus 50. Still another example of the means substituting for the switch 6 is a control device that selects no-voltage output or voltage output for the port 21a, the port 21b, the port 21c, and the port 21d individually upon receiving a user's instruction. When the control device constitutes the means substituting for the switch 6, an instruction received by the control device is transmitted to the external control apparatus 50 by wire or radio, and is provided to the switching circuit 1 by the external control apparatus 50. An example of the control device is a smartphone or a tablet personal computer.

Still another example of the means substituting for the switch 6 is a sensor that detects the state of the air outside the switching circuit 1 and a control apparatus that selects no-voltage output or voltage output for the port 21a, the port 21b, the port 21c, and the port 21d individually, based on information obtained by the sensor. An example of the sensor is a humidity sensor or a temperature sensor. The sensor is connected to the switching circuit 1. The control apparatus selects no-voltage output or voltage output for each port, based on a preset rule for the sensor and information obtained by the sensor. The control apparatus may be provided inside the switching circuit 1, or may be provided outside the switching circuit 1.

Second Embodiment

Figure 5:
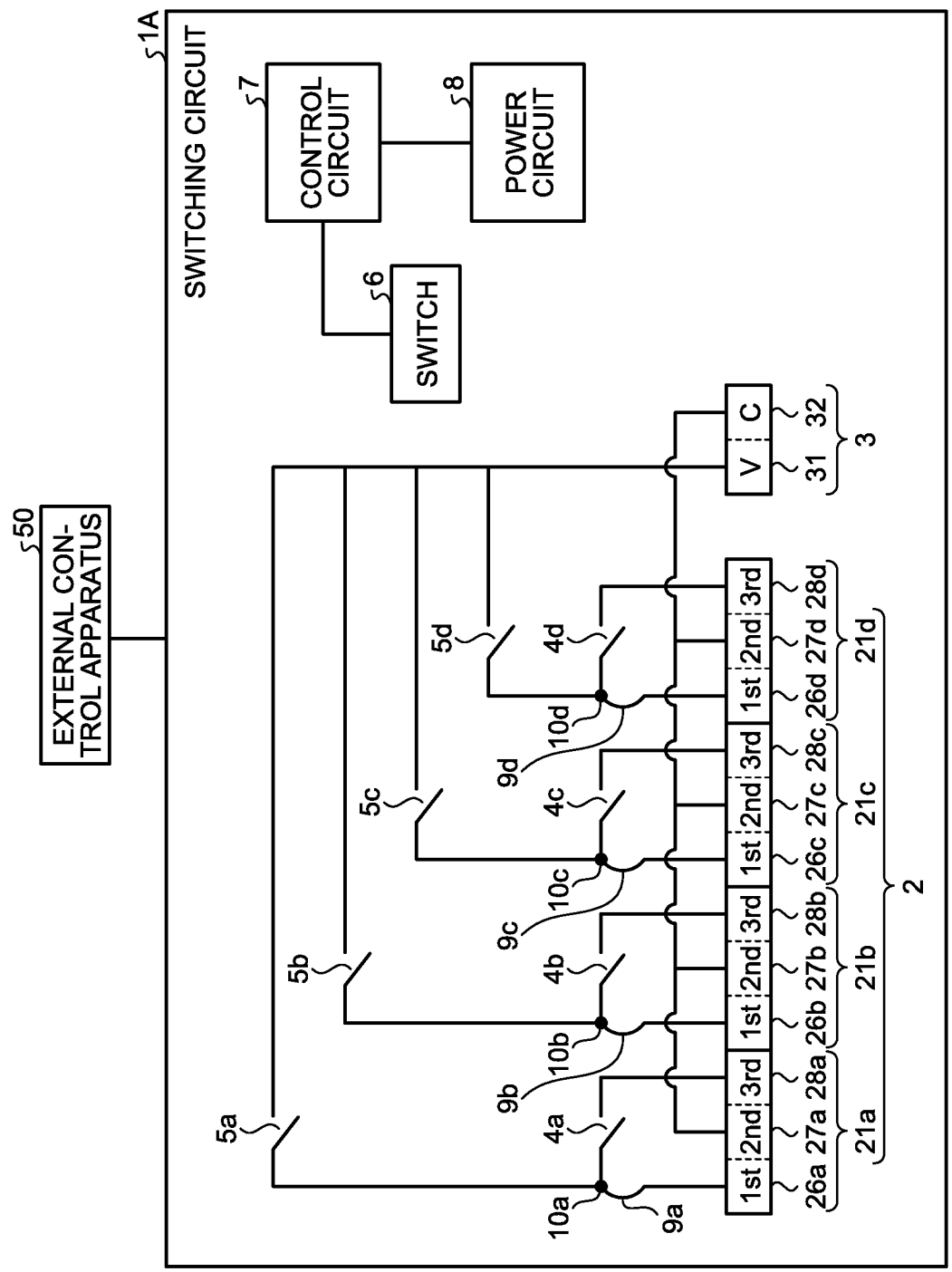
FIG. 5 is a diagram illustrating the configuration of a no-voltage output and voltage output switching circuit according to a second embodiment.

FIG. 5 is a diagram illustrating the configuration of a no-voltage output and voltage output switching circuit 1A according to a second embodiment. The switching circuit 1A in the second embodiment includes all the components of the switching circuit 1 in the first embodiment. In the second embodiment, differences from the first embodiment will be described. The switching circuit 1A further includes a jumper 9a corresponding to the port 21a, a jumper 9b corresponding to the port 21b, a jumper 9c corresponding to the port 21c, and a jumper 9d corresponding to the port 21d.

The jumper 9a connects a connection point 10a between the first relay 4a corresponding to the port 21a and the second relay 5a corresponding to the port 21a, and the first pin 26a of the corresponding port 21a. The jumper 9b connects a connection point 10b between the first relay 4b corresponding to the port 21b and the second relay 5b corresponding to the port 21b, and the first pin 26b of the corresponding port 21b. The jumper 9c connects a connection point 10c between the first relay 4c corresponding to the port 21c and the second relay 5c corresponding to the port 21c, and the first pin 26c of the corresponding port 21c. The jumper 9d connects a connection point 10d between the first relay 4d corresponding to the port 21d and the second relay 5d corresponding to the port 21d, and the first pin 26d of the corresponding port 21d. The switching circuit 1A in the second embodiment has effects identical to the effects obtained by the switching circuit 1 in the first embodiment.

Third Embodiment

Figure 6:
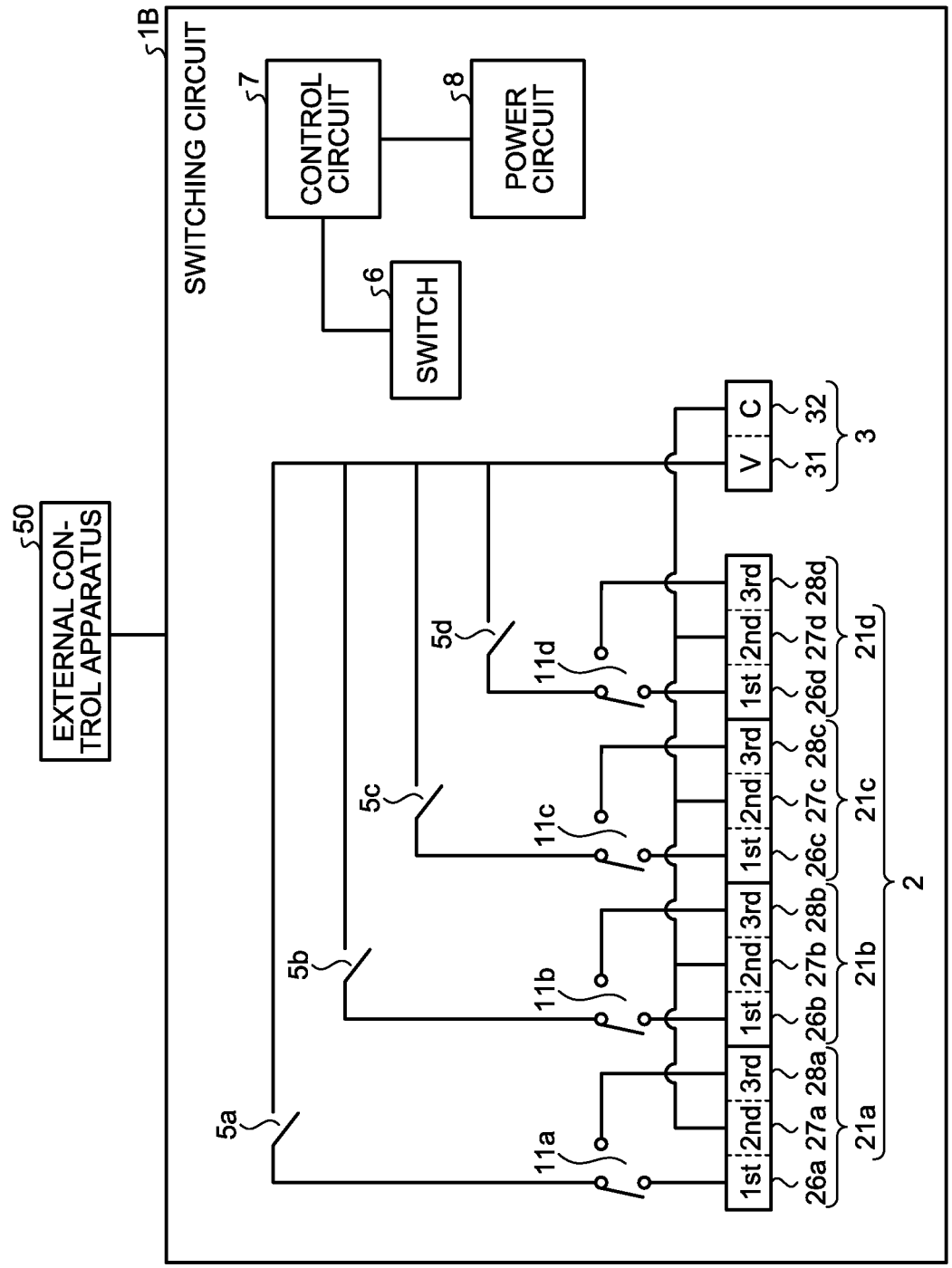
FIG. 6 is a diagram illustrating the configuration of a no-voltage output and voltage output switching circuit according to a third embodiment.

FIG. 6 is a diagram illustrating the configuration of a no-voltage output and voltage output switching circuit 1B according to a third embodiment. The switching circuit 1B in the third embodiment includes all the components of the switching circuit 1 in the first embodiment except the first relay 4a, the first relay 4b, the first relay 4c, and the first relay 4d. In the third embodiment, differences from the first embodiment will be described.

The switching circuit 1B further includes a first relay 11a, a first relay 11b, a first relay 11c, and a first relay 11d. The first relay 11a, the first relay 11b, the first relay 11c, and the first relay 11d are an example of a plurality of first relays. The first relay 11a corresponds to the port 21a, the first relay 11b corresponds to the port 21b, the first relay 11c corresponds to the port 21c, and the first relay 11d corresponds to the port 21d.

That is, the first relay 11a corresponds to the second relay 5a, the first relay 11b corresponds to the second relay 5b, the first relay 11c corresponds to the second relay 5c, and the first relay 11d corresponds to the second relay 5d. The first relay 11b, the first relay 11c, and the first relay 11d each include a function identical to that of the first relay 11a. The first relay 11a, the first relay 11b, the first relay 11c, and the first relay 11d are each a transfer contact relay.

The first relay 11a connects the first pin 26a of the port 21a and the second relay 5a, or connects the third pin 28a of the port 21a and the second relay 5a. The first relay 11b connects the first pin 26b of the port 21b and the second relay 5b, or connects the third pin 28b of the port 21b and the second relay 5b. The first relay 11c connects the first pin 26c of the port 21c and the second relay 5c, or connects the third pin 28c of the port 21c and the second relay 5c. The first relay 11d connects the first pin 26d of the port 21d and the second relay 5d, or connects the third pin 28d of the port 21d and the second relay 5d.

In the third embodiment, the second relay 5a enables connection between the corresponding first relay 11a and the voltage terminal 31, the second relay 5b enables connection between the corresponding first relay 11b and the voltage terminal 31, the second relay 5c enables connection between the corresponding first relay 11c and the voltage terminal 31, and the second relay 5d enables connection between the corresponding first relay 11d and the voltage terminal 31. That is, by using the switching circuit 1B in the third embodiment, a user can control actuators corresponding to transfer contact relays.

Fourth Embodiment

FIG. 7 is a diagram illustrating the configuration of a no-voltage output and voltage output switching circuit 1C according to a fourth embodiment. The switching circuit 1C in the fourth embodiment includes all the components of the switching circuit 1 in the first embodiment except the first relay 4c. In the fourth embodiment, differences from the first embodiment will be described.

The switching circuit 1C further includes the jumper 9a corresponding to the port 21a, the jumper 9b corresponding to the port 21b, and the first relay 11c corresponding to the port 21c. The jumper 9a and the jumper 9b are each the one described in the second embodiment. The first relay 11c is the one described in the third embodiment. In the switching circuit 1C, the first relay 4d is an example of a first specific relay. Each of the first relay 4a and the first relay 4b is also an example of the first specific relay. In the switching circuit 1C, the first relay 11c is an example of a second specific relay.

For the port 21a, the port 21b, and the port 21d, no-voltage output and voltage output can be switched, so that by using the switching circuit 1C, actuators corresponding to no-voltage output or voltage output can be controlled. For the port 21c, by using the switching circuit 1C, an actuator corresponding to a transfer contact relay can be controlled. That is, by using the switching circuit 1C, both an actuator corresponding to no-voltage output or voltage output and an actuator corresponding to a transfer contact relay can be controlled.

The control circuit 7 stores information that an actuator corresponding to a transfer contact relay is connected to the port 21c and the first relay 11c performs the operation of a transfer contact relay.

The configurations described in the above embodiments show an example of the content of the present invention, and can be combined with another known art, and can be partly omitted or changed without departing from the scope of the present invention.

REFERENCE SIGNS LIST 1, 1A, 1B, 1C no-voltage output and voltage output switching circuit; 2 actuator connection terminal block; 3 power connection terminal block; 4a, 4b, 4c, 4d, 11a, 11b, 11c, 11d first relay; 5a, 5b, 5c, 5d second relay; 6 switch; 7 control circuit; 8 power circuit; 9a, 9b, 9c, 9d jumper; 10a, 10b, 10c, 10d connection point; 21a, 21b, 21c, 21d port; 26a, 26b, 26c, 26d first pin; 27a, 27b, 27c, 27d second pin; 28a, 28b, 28c, 28d third pin; 31 voltage terminal; 32 common terminal; 50 external control apparatus; 61 processing circuit; 71 memory; 72 processor.

The invention claimed is:

1. A no-voltage output and voltage output switching circuit comprising:
   an actuator connection terminal block including a plurality of ports each including a first pin, a second pin, and a third pin to which an actuator is connected;
   a power connection terminal block including a voltage terminal and a common terminal to which a power supply is connected;
   a plurality of first relays;
   a plurality of second relays; and
   a control circuit to control each of the plurality of first relays and the plurality of second relays,
   wherein
   the voltage terminal is a terminal to which a voltage different from a voltage applied to the common terminal is applied when the power supply is connected to the power connection terminal block,
   the common terminal is connected to the second pin of each of the plurality of ports,
   each of the plurality of first relays corresponds to one of the plurality of ports, and each of the plurality of ports corresponds to one of the plurality of first relays,
   each of the plurality of second relays corresponds to one of the plurality of ports, and each of the plurality of ports corresponds to one of the plurality of second relays,
   one of the plurality of first relays is a first specific relay to enable connection between the first pin of a corresponding port among the plurality of ports and the third pin of the corresponding port,
   a second relay corresponding to a port among the plurality of ports corresponding to the first specific relay enables connection between the first pin of the port corresponding to the first specific relay and the voltage terminal, and
   at each of the plurality of ports, (i) the control circuit turns a first relay among the plurality of the first relays on to connect the first pin and the third pin and the control circuit turns a second relay among the plurality of the second relays off to isolate the first pin from the voltage terminal in order to create a no-voltage condition at the actuator, and (ii) the control circuit turns the first relay off to isolate the first pin from the third pin and the control circuit turns the second relay on to connect the first pin and the voltage terminal in order to create a voltage condition at the actuator.

2. The no-voltage output and voltage output switching circuit according to claim 1, further comprising:
   a jumper to connect a connection point between the first specific relay and the second relay corresponding to the first specific relay, and the first pin of the port corresponding to the first specific relay.

3. The no-voltage output and voltage output switching circuit according to claim 1, wherein
   each of the plurality of first relays including the first specific relay enables connection between the first pin of a corresponding port among the plurality of ports and the third pin of the corresponding port, and
   each of the plurality of second relays enables connection between the first pin of a corresponding port among the plurality of ports and the voltage terminal.

4. The no-voltage output and voltage output switching circuit according to claim 1, further comprising:
   a plurality of jumpers, wherein
   each of the plurality of jumpers corresponds to one of the plurality of ports, and each of the plurality of ports corresponds to one of the plurality of jumpers, and
   each of the plurality of jumpers connects a connection point between a corresponding first relay among the plurality of first relays and a corresponding second relay among the plurality of second relays, and the first pin of a corresponding port among the plurality of ports.

5. The no-voltage output and voltage output switching circuit according to claim 1, wherein
   one of the plurality of first relays other than the first specific relay is a second specific relay to connect the first pin of a corresponding port among the plurality of ports and a corresponding second relay among the plurality of second relays, or connect the third pin of the corresponding port and the corresponding second relay, and the second relay corresponding to the second specific relay enables connection between the second specific relay and the voltage terminal.

6. The no-voltage output and voltage output switching circuit according to claim 1, further comprising a switch to allow a user to select either no-voltage output or voltage output for each of the plurality of ports, wherein the control circuit controls each of the plurality of first relays and the plurality of second relays, according to a selection made by the user using the switch.

* * * * *